United States Patent [19]

Brodsky et al.

[11] 4,163,123
[45] Jul. 31, 1979

[54] ELECTRONIC TOUR GUIDE SYSTEM

[76] Inventors: Harvey A. Brodsky, 9323 Lincolnwood Dr., Evanston, Ill. 60203; William D. Becker, 1057 W. Belden Ave., Chicago, Ill. 60614

[21] Appl. No.: 916,857

[22] Filed: Jun. 19, 1978

[51] Int. Cl.$^2$ .............................. H04J 3/08; H04B 9/00
[52] U.S. Cl. ................................. 179/15 AL; 179/82; 250/199
[58] Field of Search ............. 179/15 AL, 82; 250/199

[56] References Cited

U.S. PATENT DOCUMENTS

| | | | |
|---|---|---|---|
| 3,529,089 | 9/1970 | Davis | 179/15 AL |
| 3,598,923 | 8/1971 | Turner | 179/82 |
| 3,927,316 | 12/1975 | Citta | 250/199 |
| 3,934,202 | 1/1976 | Missale | 179/82 |
| 4,091,272 | 5/1978 | Richter | 250/199 |

*Primary Examiner*—David L. Stewart
*Attorney, Agent, or Firm*—Fitch, Even & Tabin

[57] ABSTRACT

An electronic tour guide system is disclosed which provides messages about exhibits in a museum or the like to visitors carrying portable receivers. Audio sources which generate various messages are provided at a central location which are multiplexed and digitized and applied to one or more cables which extend to the covered areas. Receiver-transmitters are located along the cables and are adapted to decode one of the messages and transmit the same via infrared energy into a well defined area adjacent the exhibit, enabling a visitor having a receiver to receive the infrared radiated signal information and hear the message.

23 Claims, 8 Drawing Figures

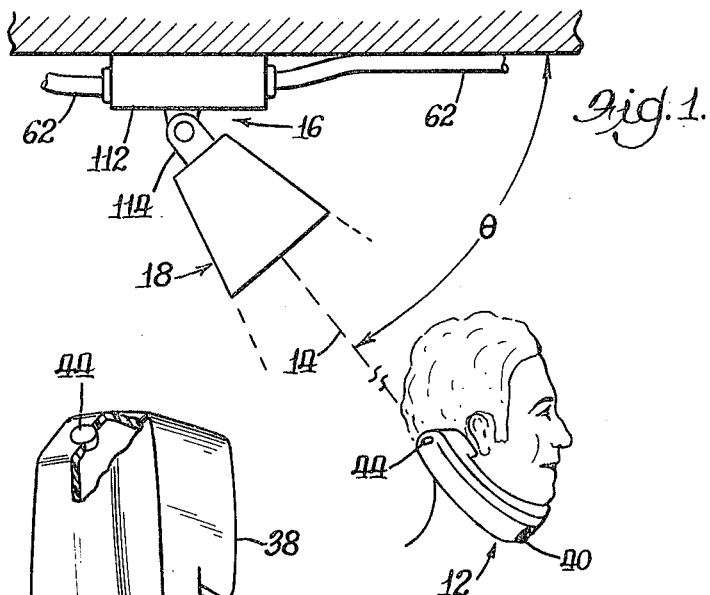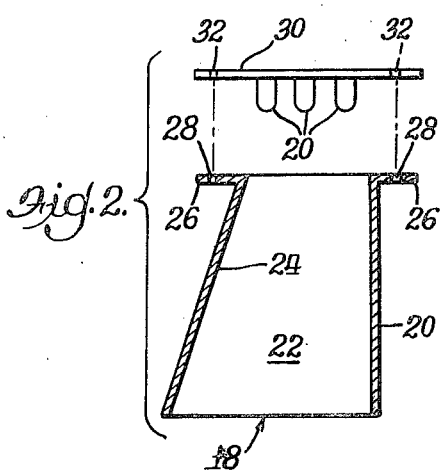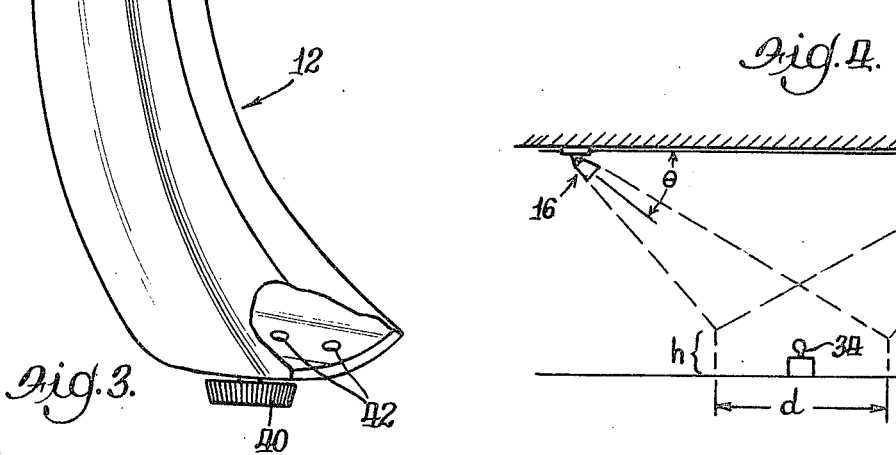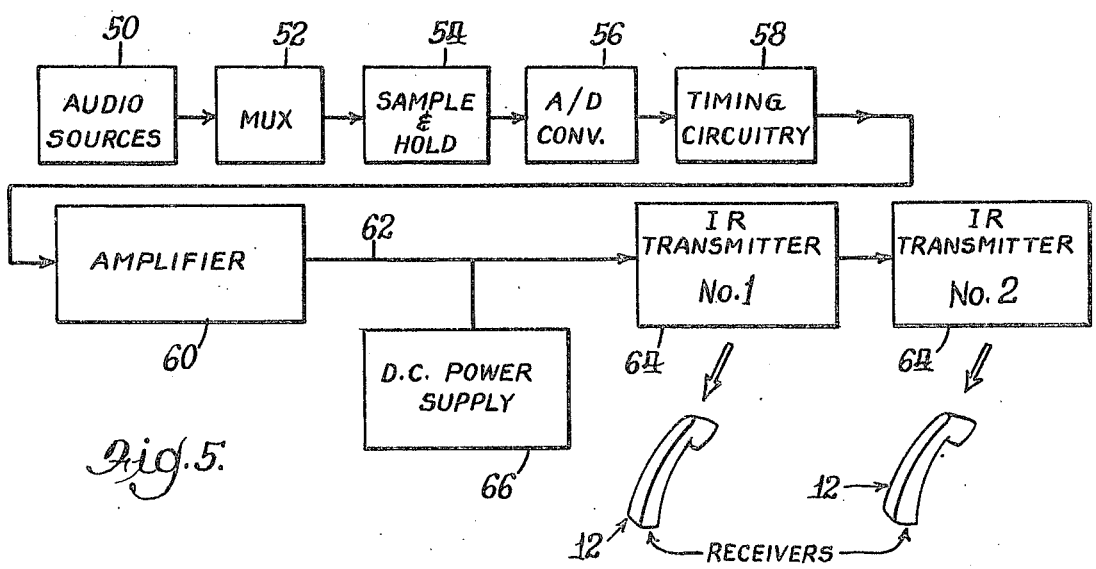

ELECTRONIC TOUR GUIDE SYSTEM

The present invention generally relates to electronic tour guide systems and, more specifically, to such systems that incorporate the use of infrared energy for transmitting signal information to portable receivers.

There have been many attempts in developing tour guide systems for providing information to visitors in a museum, art gallery or the like to convey interesting information about the exhibits to the visitors. Systems have utilized radio frequency radiation as well as portable prerecorded tape recording playback devices. These latter devices are undoubtedly portable and can be carried around to the various exhibits, but one of their inherent disadvantages is that the visitor must travel a predetermined path and make sure that each separate message is for the particular exhibit that is being viewed. Thus, these devices do not permit the visitor to deviate from a prescribed path or the messages will be heard out of order and the device is only marginally useful in its purpose. Also, these devices sometimes suffer from the problem of discerning when one message has ended and another has started. While radio frequency systems do not suffer from these problems, in that they can transmit information relating to an exhibit into a room that contains the particular exhibit, they also suffer from problems of radio frequency interference from other RF devices in the vicinity and they also pick up general RF noise from surrounding areas. Such RF interference very often effectively prevents the use of more than one RF device in a single room which impairs the effective use of messages for more than one exhibit in a single room or open area. Systems that transmit radio frequency signals also have the practical disadvantage of requiring a license from the Federal Communications Commission.

While infrared transmission has been used in teaching apparatus as well as remote speaker systems, such systems typically involve stationary receivers associated with the speakers or teaching devices and also use lens systems for focusing the infrared energy to the stationary receiver and involve many different considerations as contrasted with a tour guide system.

Accordingly, it is an object of the present invention to provide an improved electronic tour guide system that incorporates an infrared radiation energy link for transmitting to portable receivers carried by visitors in a museum, art gallery or the like, which system transmits the energy into various well defined areas.

A related object is to provide a system of the foregoing type which transmits information signals via infrared energy, wherein the signal strength in well defined areas is generally uniform.

Another object of the present invention lies in the provision of the portable receiver units being comfortable, convenient and easily operable by visitors using the same, in that visitors can easily listen to recorded messages by merely holding the receiver in a manner similar to holding a telephone.

Other objects and advantages will become apparent upon reading the following detailed description, in conjunction with the attached drawings, in which:

FIG. 1 is a side view of apparatus embodying the present invention, particularly illustrating transmitter and receiver units in an installation of an embodiment of the present invention;

FIG. 2 is a side view, partially in section, illustrating a portion of the transmitter unit embodying the present invention;

FIG. 3 is an enlarged perspective view, with portions broken away, illustrating a receiver unit of the present invention;

FIG. 4 is a side view of a system embodying the present invention installed in an art gallery, museum or the like and particularly illustrating two transmitting units covering a well defined area;

FIG. 5 is a functional block diagram of the system embodying the present invention;

Figure 6:
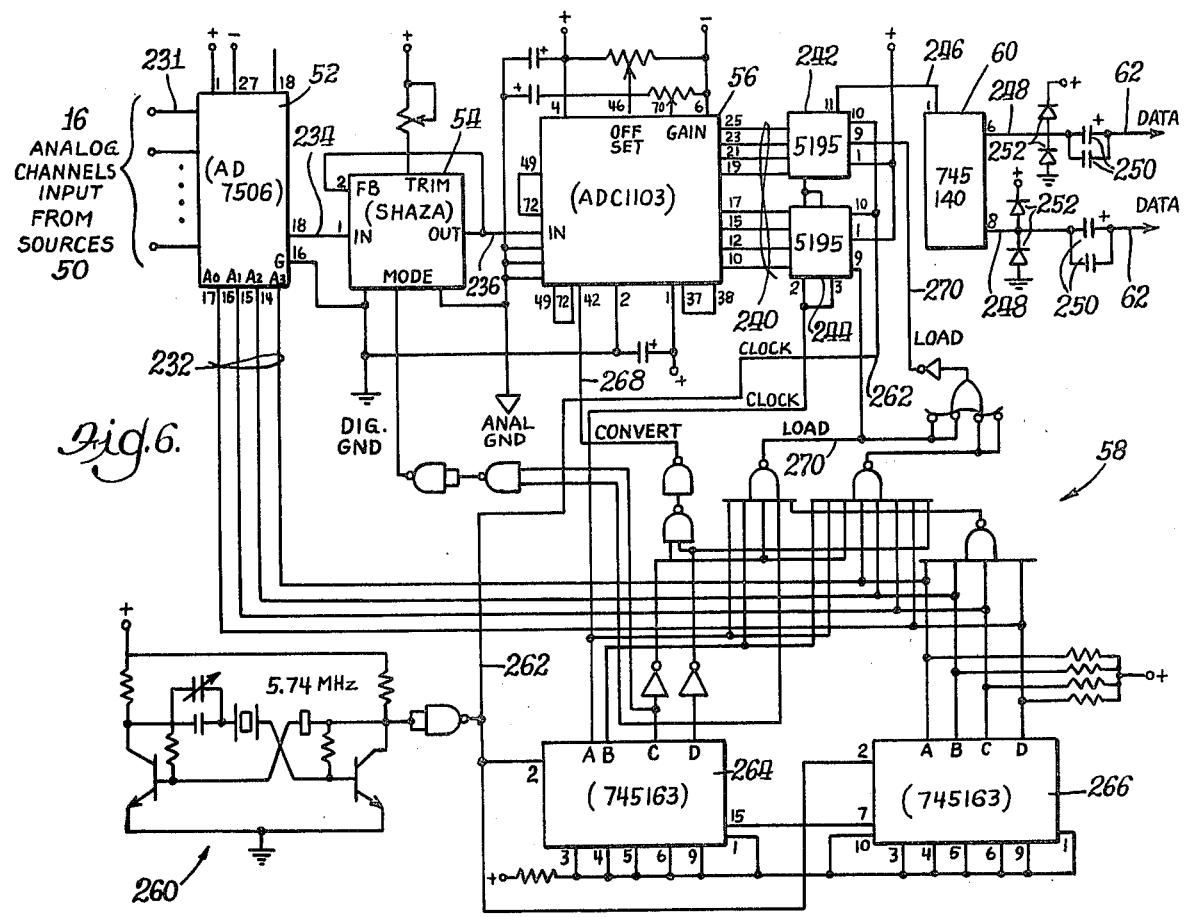
FIG. 6 is a detailed electrical schematic diagram showing one specific embodiment of circuitry that can be used to carry out the operation of the multiplexing and analog-to-digital conversion of signals that are sent to the transmitting units of the present invention.

Broadly stated, the present invention is directed to an electronic tour guide system that can be used in museums, art galleries and the like for the purpose of providing messages to visitors carrying portable receiving units, the messages explaining various exhibits to the visitors as they circulate through the facility. The system has many desirable attributes in terms of its ease of operation from the standpoint of the operation and management of the system, as well as the standpoint of convenience, flexibility and operability to the visitor carrying the portable receiver units. The system exhibits great flexibility for the visitor in that if he is in an area adjacent a particular exhibit for which a message has been prerecorded and is being transmitted, he will receive and hear that message and no other messages. Since the only message being transmitted in the immediate area of a covered exhibit will be the message for that particular exhibit, the visitor can circulate throughout the museum or gallery along any ramdom course and always be assured of hearing the message relating to the exhibit being viewed. The system has a central control station which contains the message sources, which may be a number of prerecorded tapes which are repeatedly played and the central control unit multiplexes these messages onto one or more coaxial cables that extend out into the area or areas having the exhibits. Receiver-transmitters located in the areas receive the multiplexed signal information and decode the appropriate message and transmit the same via infrared energy into a well defined area adjacent the particular exhibit. Any visitor having a portable receiver unit that comes within the well defined area will hear the message being transmitted.

The system provides generally uniform signal strength in the well defined area so that the visitor having a receiver unit can view the exhibit from any normal position within the area and hear the message concerning that exhibits as long as he stays within the area and orients the receiver unit in a generally normal position. In this regard, the portable receiver unit has the shape of a telephone handset and should be held in a position similar to that which would be assumed in a telephone conversation. When this is done, the infrared energy detector will receive the infrared signal being transmitted into the well defined area, regardless of whether the visitor holds the portable receiver unit to either his left or right ear.

The system effectively multiplexes a plurality of separate channels of audio information onto a single signal processing path, samples the various audio signals, converts them to digital signals and through appropriate timing circuitry, applies the digitized signals through one or more coaxial cables into the areas having the exhibits. In the immediate area of an exhibit where a message is to be transmitted, transmitting units decode the appropriate digitized channel of the various digitized and multiplexed channels and convert the appropriate channel signal to an analog signal and transmit the information using wide band frequency modulation of an infrared radiation energy. An infrared energy detector in the receiver units receives the infrared radiation being transmitted and demodulates the signal to produce an audio signal that drives a speaker in the receiver unit to which the visitor listens.

Turning now to the drawings, and particularly FIG. 1, a visitor is shown having a portable receiver unit indicated generally at 12 which is in position to receive the frequency modulated infrared signal energy generally along line 14 that is being transmitted from a transmitting unit, indicated generally at 16. As is shown by the perspective illustrations of FIG. 1 and FIG. 3, the receiver unit 12 is generally in the shape of a telephone handset and is designed so that the visitor holds the receiver unit in the same convenient position he would if he were engaged in a telephone conversation, which of course is the position most people would assume by habit from using the telephone during their daily lives. Thus, the receiver unit embodying the present invention is familiar in use and does not require the visitor to do anything extraordinarily unusual during the operation of the unit. If he is viewing an exhibit, he needs merely to place the receiver to his ear in the normal manner, hear the message that is being transmitted and unless he wants to hear it a second time, he can merely take the receiver away from his ear and hold it in any manner that he wishes. When he has positioned the receiver unit so that the earphone is near his ear, the unit is in position to receive the infrared transmitted signal from the transmitting unit 16. The visitor in FIG. 1 is shown looking to the right at an exhibit, and the transmitting unit 16 is preferably located on the ceiling or other structural member so that the angle $\theta$ between the horizontal and the center line 14 of the transmission is preferably about 50°.

In keeping with the present invention, the transmitting unit 16, shown in FIGS. 1 and 2 has a reflective horn 18 that is preferably made of polished aluminum or other reflective material so that the infrared radiation can be directed into a well defined area dajacent the exhibit for which a message is being transmitted. The reflective horn 18 is preferably in the shape of a generally hollow, truncated pyramid, with the exact shape being dependent upon the well defined area to which the infrared radiation is to be transmitted. It is important that the radiation be of generally uniform density or strength throughout the well defined area and at a height of about 5 to about 6 feet above the floor. The frequency modulated infrared energy is produced by light emitting diodes, i.e., the diodes 20 shown in FIG. 2 which are positioned near the upper truncated portion of the reflective horn 18 and the angle of the sidewalls 20, 22 and 24 (the fourth sidewall not being shown in FIG. 2) should be such that the infrared radiation is transmitted downwardly with the horn directing the radiation being emitted by the light emitting diodes 20 to the well defined area. In this regard, the angle and length of the sidewalls should be such that single reflection occurs which tends to direct the radiation into the area, but should not be extraordinarily long or narrow so that double reflection of the energy occurs, since this could effectively widen the field or, stated in other words, enlarge the well defined area. The internal surface of the reflective horns are preferably highly reflective to minimize the losses that are necessarily experienced by reflection from the surface. It should also be understood that while the truncated pyramidal shape is preferred, other shapes and even a flat surface may suffice to direct the infrared radiation into the desired well defined area in certain installations. While there are many materials that are acceptable for use in the reflective horns 18, a highly polished aluminum, such as ALZAK brand aluminum, made by the Aluminum Company of America, Pittsburgh, Pa., is quite suitable and has the advantage of being a light weight material that can also be easily fabricated into the desired shapes. As shown in FIG. 2, the truncated top portion of the sidwalls 20 and 24 are preferably outwardly deflected to form transverse flanges 26 which have apertures 28 therein for mounting a substrate 30 carrying the light emitting diodes 20. The substrate 30 has apertures 32 therein and any suitable fastening means such as bolts, rivets or the like can be used to fasten the reflective horns 18 and the substrate 30 together. The light emitting diodes 20 must necessarily radiate energy at a wavelength in the infrared range and must be of a type where the radiation can be modulated, preferably by modulation of the current flowing through them. One infrared light emitting diode that performs adequately is the model LD 241 GaAs infrared emitting diode manufactured by the Siemens Company of Berlin, West Germany. The infrared light emitting diode made by Siemens has an overall length of about ¼ inch with a diameter of ⅛ inch and has a hemispherical transmitting lens in the end for radiating infrared energy. As is shown in FIG. 2, there are three light emitting diodes 20 shown in a row, and it is preferred that a total of 6 light emitting diodes be utilized, since approximately 6 times the energy will result utilizing generally the same low voltage and virtually no additional current. For higher ceilings in a museum or the like where additional power is required, significantly more than six light emitting diodes can be clustered within a reflective horn to provide additional output.

A single transmitting unit 16, such as shown in FIG. 1 may often be used where the exhibit being observed by visitors is against the wall or can only be viewed from a single direction so that the relationship between the receiver and the transmitting unit is generally as shown in FIG. 1. However, when an exhibit is located in an open area where visitors can view the same from many directions, such as shown in FIG. 4 where an exhibit 34 is located in an open area, then two or more transmitting units 16 may be required to adequately insure that visitors having receivers will be able to receive the infrared energy signal and thereby hear the message. In the installation of FIG. 4, two transmitting units are shown to be spaced apart from one another and direct the infrared light into a well defined area having a distance d and both transmitting units cover the same area from different directions at the appropriate angle θ of preferably 50° in the manner shown in and described with respect to FIG. 1. It should be understood that both transmitting units are transmitting the same signal information so that a visitor will hear the same message regardless of which side of the exhibit 34 he is located. As will be hereinafter explained, one of the transmitting units 16 will have considerably less circuitry associated with it, one of the two essentially being a satellite and having only driving circuitry for the additional cluster of infrared light emitting diodes.

In accordance with an important aspect of the present invention and referring to FIGS. 1 and 3, the receiver unit 12 is in the shape of a telephone handset having an earphone in the upper end portion 38. The receiver unit 12 preferably has a volume control knob 40 at the lower end and also has a pair of openings 42 in the lower end for placement upon charging terminals of a battery charging apparatus for charging an internal battery that powers the portable receiver unit. At the end of a day when the gallery or museum is closed, the receiver units that have been used can be placed on the charging terminals. The terminals are preferably of the type which comprise two spaced prongs that are vertically oriented which facilitates placement of the receiver unit on them with the prongs being inserted in the openings 42. Thus, the prongs not only provide charging current for charging the battery, but can hold the receiver in a generally upright position. At the upper end of the receiver unit is a small generally circular flat disc shaped infrared transmission filter 44 which receives the infrared radiation and passes the same to an infrared sensitive photodiode that functions as an infrared detector for the frequency modulated signal. The filter is preferably of a flat disc shape rather than a lens, since a lens tends to concentrate or focus the infrared light and creates directionality which is preferably minimized. The filter 44 is also preferably flush with the outer surface of the receiver unit or slightly recessed below it. The flat configuration is preferred for the reason that different users may have a preference for listening to the message with either the right or the left ear. As can be appreciated from FIG. 1, a user will have the filter 44 oriented substantially in the same relative position to the infrared radiation regardless of whether he holds the receiver to his right ear or his left ear. In the event that the transmitting unit 16 was placed directly overhead and some provision was made to orient the filter 44 directly vertically, then the device would be adapted to receive the radiation favorably when held to one ear and would be almost directed downwardly if held to the other ear in the normal manner. Thus, the use of a filter rather than a lens, with the filter placed in the same plane of the surface of the receiver unit, together with the transmitting units being located rearwardly at an angle of about 50° relative to horizontal, insures that the photodiode located immediately below the filter 44 can detect the modulated infrared radiation regardless of whether the user places the receiver unit so as to listen with either ear.

Referring to the block diagram of FIG. 5, the messages that are to be eventually received by the portable receiver units 12 carried by visitors in the art gallery, museum or the like originate at a central location. Audio sources 50 which may comprise program repeaters of the type which play continuous loop magnetic tapes and thereby repeat prerecorded messages concerning each of the exhibits that is to be covered. One program repeater that is suited for use as an audio source is the model 500 program repeater manufactured by the MacKenzie Laboratories of Arcadia, Calif. Such program repeaters have a continuous loop of magnetic tape which is continuously played during operation so that a visitor which comes into an area of an exhibit will hear the message concerning that exhibit, although the timing is haphazard in that the visitor may begin hearing the message at a place other than the beginning of it. However, the visitor may also hear the message as many times as he wishes to remain in the area of the exhibit. In any case, the audio sources, which in the system being described, may number up to 16 separate channels using the specific circuitry that will be hereinafter described, is multiplexed by a multiplexer 52 which takes the analog signals produced by the audio sources and applies them to sample and hold circuitry 54, also in the analog domain, and the sample and hold circuitry 54 presents the level to an analog-to-digital converter 56 which converts the analog signal to the digital domain. Through appropriate timing circuitry 58 which will be hereinafter described, the digital multiplexed signals are applied to one or more coaxial cables 62 after having been amplified by amplifier 60. The digitally encoded signals travel down the coaxial cable 62 to transmitting units 64 which are located in the areas containing the exhibits.

The transmitting units receive the data, recover the appropriate channel and transmit the information using infrared energy to the receiving units 12 which receive the same and drive a speaker in the receiving unit for listening by the visitor carrying the same. The transmitting units 64 perform several functions in that they derive the DC voltage from the cable for their own power requirements, receive the multiplexed digital AC signal, reconstruct and reclock the signal if such is necessary as will be hereinafter explained, reconstruct the AC signal, in effect reshaping the same so that they can derive the clock signal from the digital signal. The units 62 also demultiplex the digital signal with the derived clock and decode the correct channel, perform a digital-to-analog conversion, shift the level of the signal and further condition it by giving it pre-emphasis and finally frequency modulate a current through infrared energy light emitting diodes for transmission into a well defined area adjacent an exhibit for which a message has been prerecorded.

With respect to the reconstruction and reclocking of the signal, the digital signal carrying the information becomes distorted through transmission of the cable when it travels an extensive distance and it may be necessary to reconstruct and reclock the signal at intervals to maintain a reasonably coherent signal that permits the transmitting unit to derive the clock as well as the data in a reliable manner. The output of the amplifier 60 is capacitively coupled to the coaxial cable 62 and a DC power supply 66 injects low voltage DC power onto the coaxial cable for use by the transmitting units.

Figure 7:
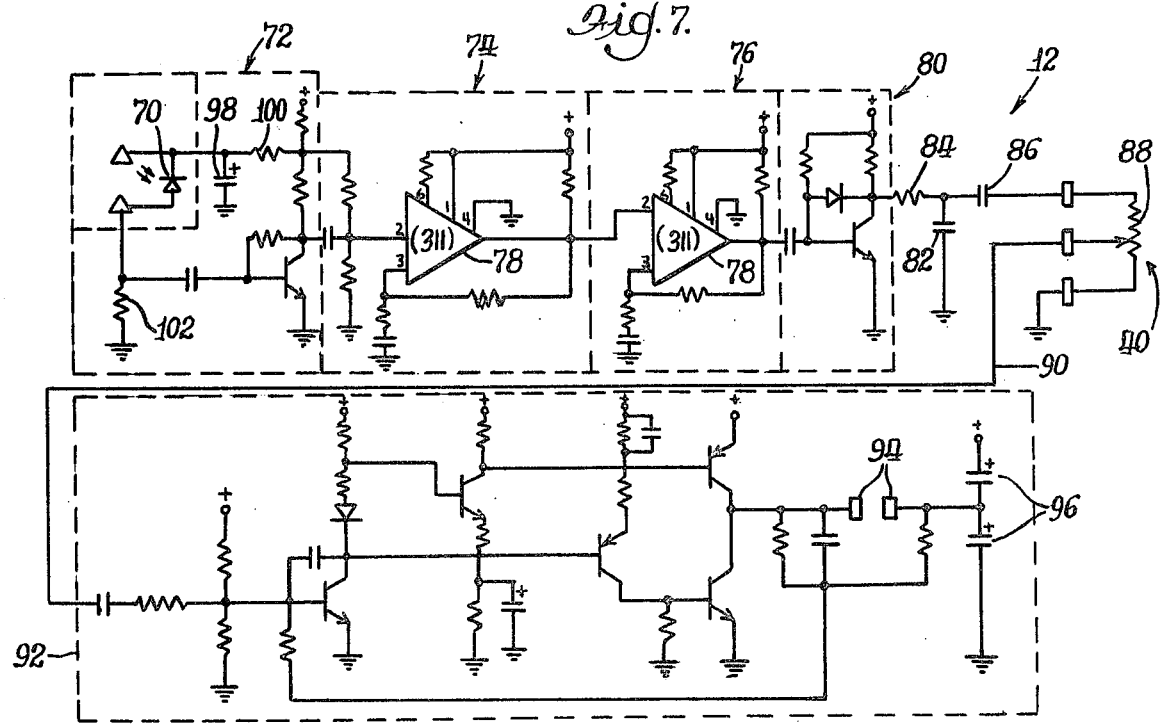
FIG. 7 is a detailed electrical schematic diagram illustrating one embodiment of circuitry that can be used in the receiver units of the present invention.

With respect to the specific circuitry that can be used to carry out the functions of the block diagram shown in FIG. 5, the circuitry of the receiver unit will now be described in conjunction with FIG. 7 which illustrates detailed electrical schematic diagrams of one embodiment of circuitry that can be used in the receiver unit to detect the modulated infrared signal, convert the same to an audio signal for driving a telephone receiver. The frequency modulated infrared energy is detected by a photo diode that is sensitive to infrared energy and is preferably a model BPW 34 silicon planar photo diode manufactured by the Siemens Company of Berlin, West Germany. The signal produced by the photo diode 70 is applied to a first transistor stage, indicated generally at 72, which provides impedance interfacing as well as a small amount of gain, and the signal is then amplified and limited by two successive stages indicated generally at 74 and 76 which essentially comprise the operational amplifiers 78. Following the amplifying and limiting stage 76 is a demodulating stage 80 which is of conventional design and is of the type that demodulates by counting the pulses of the FM signal and operates similarly to a one shot multivibrator and produces a pulse of fixed width in response to a negative transition from the amplifying stage 76. The pulses are integrated across a capacitor 82 and thereby produce an amplitude modulated signal and the capacitor 82 together with a resistor 84 provide the deemphasis for the FM signal. A capacitor 86 provides AC coupling to a potentiometer 88 which operates as the volume control 40 with the signal appearing on line 90 that extends to an audio amplifier indicated generally at 92 that is of generally conventional design. The receiving element of the receiver unit is placed across the terminals 94 and may be the standard receiver that is used in conventional telephone handsets. The audio amplifier is of conventional design for use with low impedance receivers and the use of two capacitors 96 is typical in that it establishes an artificial ground reference between the two which enables the signal to go above and below the reference and thereby permits reproduction of a sine wave without significant distortion.

Referring again to the initial impedance matching stage 72, a capacitor 98 and resistor 100 are provided to provide decoupling to the high voltage side of the photo diode 70 and a leakage resistor 102 is provided to provide a DC path to ground for charges that may accumulate.

To provide the signals that are transmitted via the infrared energy link to the receiving units, the transmitting units 16 previously broadly described with respect to FIGS. 1, 2 and 5 will now be described in conjunction with detailed electrical schematic diagrams, shown in FIG. 8. Before describing the circuitry in detail, it should be appreciated that the upper portion of FIG. 8 includes the line receiver, clock and voltage generator for the circuitry shown in FIG. 8 and the middle portion of FIG. 8 illustrates circuitry for detecting the appropriate digitally multiplexed channel from the plurality of channels that are present along the cable 62 and converts the digital signal to an analog signal which is further processed by the circuitry shown in the lower portion of FIG. 8.

Figure 8:
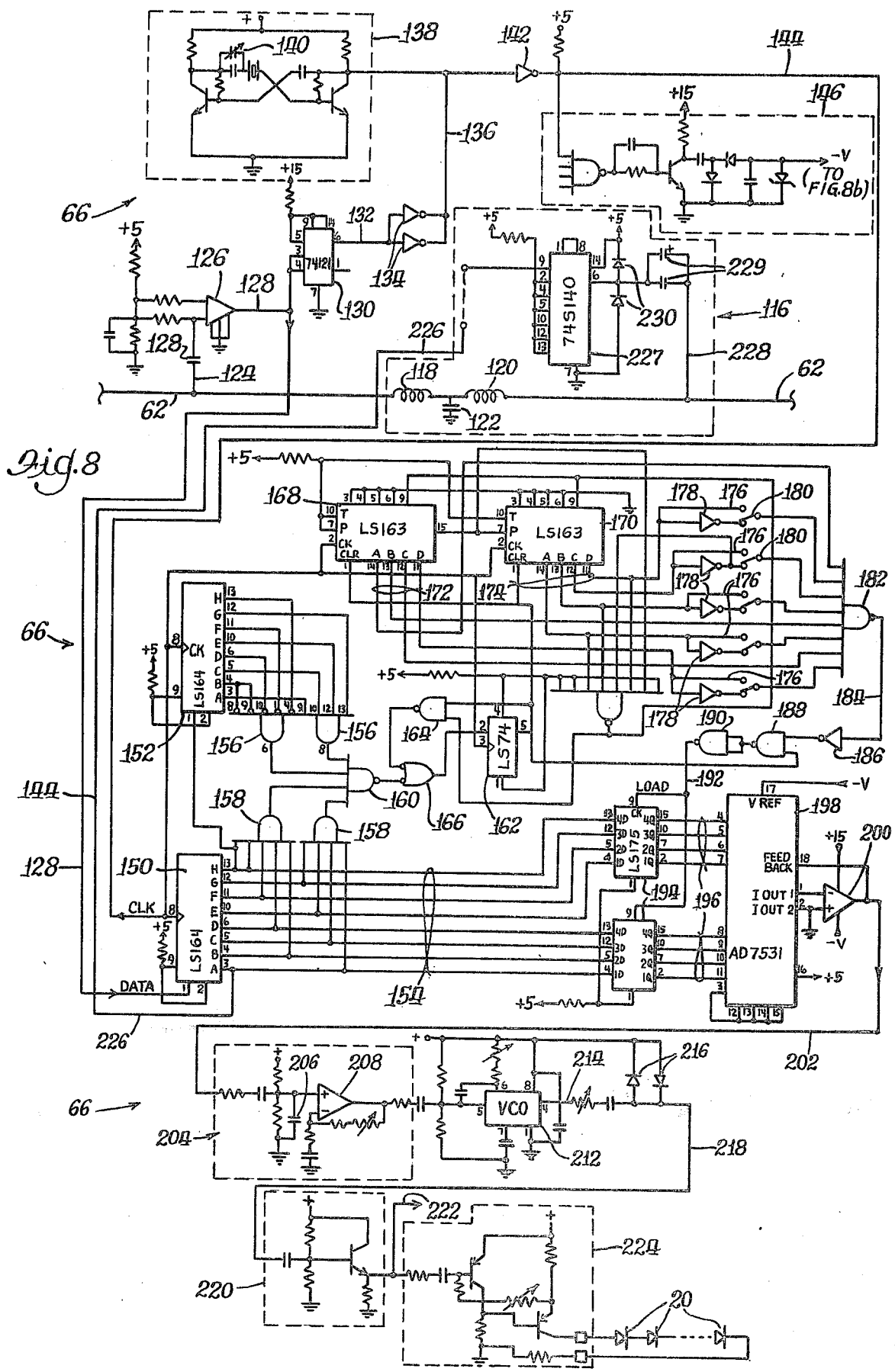
FIG. 8 is a detailed electrical schematic circuit diagram of a portion of the transmitting units, particularly illustrating circuitry for generating clock signals and receiving the digital signals from the cable, the digital signal processing circuitry and the analog signal processing circuitry.

Turning initially to FIG. 8, the cable 62 is preferably a coaxial cable from the control unit where the signals are initially multiplexed and digitized for transmission thereon. Referring briefly to FIG. 1, the cable 62 is shown to extend through an enclosure 112 which contains the circuitry shown in FIG. 8 with a suitable adjustable bracket 114 being provided to properly orient the reflective horn 18 for properly directing the infrared energy. As previously mentioned, the digital signal being sent through the coaxial cable 62 will become distorted as it travels along the cable and for this reason, it is desirable to reclock the signal at intervals for minimizing the phase distortion that is created. When the reclocking is to be performed, reclocking circuitry shown generally at 116 is included within the enclosure 112. If reclocking is not to be performed at a transmitting unit location, then the circuitry shown within the dotted area identified by reference 116 is not necessary and the cable 62 will be continuous without the presence of inductors 118, 120 and capacitor 122. Inductor 118 provides a high impedance load for the AC signal yet allows the DC voltage to be picked off, regulated and used for the internal circuitry. The data on the line 62 appears at the left ahead of the inductor 118 and is applied via line 124 to a line receiver or comparator 126 through a DC blocking capacitor 128. The line receiver is biased so that both inputs are at approximately the same level and thereby reconstructs the AC signal which appears on output line 128 in a squared-up fashion. The signal on line 128 is then applied to FIG. 8 as well as to a one-shot multivibrator 130, the output line 132 of which is high in response to a low going pulse on line input 128. The signal on line 132 is buffered by inverters 134 and the output thereof on line 136 extends to a crystal oscillator indicated generally at 138 which has an internal trimmer 140 for adjusting the frequency of the oscillator to a level within about 100 to about 400 hertz lower than and preferably about 200 hertz lower than the frequency of the digitally multiplexed signal that is generated at the central control unit. The signal on line 136 phase locks the oscillator output so that it is substantially identical to the basic frequency of the multiplexed signal which, after passing through an inverter 142 appears as a clock output on line 144 which drives the digital processing circuitry of FIG. 8. Also, the circuitry shown generally at 146 generates the negative voltage that is required for the circuitry shown in FIG. 8. The data on line 128 from the line receiver 126 is applied to shift registers 150 and 152 which provide parallel output of the data on eight lines 154. The shift registers 150 and 152 are interconnected to generate 16 bits of information, with the upper shift register 152 effectively providing only detection or identification of the sync word which is preferably 16 bits or two consecutive 8 bit words, of alternating binary ones and zeroes. The outputs of the shift registers 150 and 152 are applied to upper gates 156 and lower gates 158 which constantly examine the data stream for the presence of the sync word. When it is present, then the gates 156 and 158 are satisfied and the outputs of these gates are applied to a NAND gate 160 which is true when the sync word is present. A latch 162, together with gates 164 and 166 are arranged so that once the sync word is detected, the circuitry will only look for the sync word at the proper location or window, i.e., once each frame, so that the actual audio portion of the signal between successive sync words will not fortuitously indicate that a sync word is present. Accordingly, the latch 162 effectively determines whether the circuitry is in sync or not.

A pair of counters 168 and 170 effectively count down from the occurrence of sync and enable the circuitry to find the proper channel that is to be decoded by a particular transmitting unit. The outputs of the counters 168 and 170 appear on lines 172 and 174, respectively, which are gated through five lines 176 and five inverters 178 which are connected to five switches 180 which can be set to decode the appropriate channel from the multiplexed digital signal containing the plurality of channels that are present on the cable 62. Thus, the switches 180 are set to pick off the channel carrying the message which is to be transmitted in the appropriate area. If a specified channel is to be detected, the switches 180 are set so that when the counters reach the appropriate channel number, a NAND gate 182 will be true and its output on line 184 will extend through inverter 186, gates 188 and 190 and line 192, and will load the latches 194 to which the lines 154 containing the digital information for that channel are connected. Thus, when the latches are provided with the load command, the data for the specified channel will be present on line 154 and can be latched into the latches 194. The information from the latches 194 is presented via lines 196 to a digital-to-analog converter 198 and it converts the digital signals to analog signals which are then applied via operational amplifier 200 and line 202 to the analog processing circuitry of FIG. 8.

While the signal on line 202 is an analog signal, it is in a staircase form. It is applied to a first stage amplifier, indicated generally at 204, which sets the peak-to-peak level of the signal. A capacitor 206 smooths the stepped signal before it reaches an operational amplifier 208. The operational amplifier 208 also filters any residual steps that are present in the signal that appears at the input of the operational amplifier 208. The amplifier stage 204 also provides pre-emphasis of the signal. The output of the operational amplifier 208 is applied to a voltage controlled oscillator 212 which produces a triangular waveform on output line 214 and a pair of diodes 216 shape the triangular waveform to appear more sinusoidal. The output of the oscillator 212 has a predetermined level and the signal information either increases or decreases the frequency in the conventional manner. After the diodes shape the signal, the signal appearing on line 218 is applied to an emitter follower buffer stage 220 and the output of the emitter follower stage appears on line 222 which drives an output current drive stage, indicated generally at 224, which modulates the current for driving the infrared light emitting diodes that are connected to it and also provides the proper DC bias for the diodes.

As previously mentioned, an exhibit in an open area which can be viewed by visitors from several directions may necessitate the use of infrared energy being transmitted from different directions, as shown in FIG. 4. When this is required, then it is only necessary that line 222 shown in FIG. 8 be extended to the alternate location and a separate drive stage 224 for driving the second group of light emitting diodes 20 is only necessary, so that complete duplicaton of the circuitry shown in FIG. 8 is not required. This provides a distinct advantage in that multiple directional coverage of an exhibit area can be accomplished without undue expense or complexity.

Referring again to the reclocking circuitry 116 shown in FIG. 8, it reclocks the digitally multiplexed signal appearing on the line 62 when the phase distortion of the signal has been determined to be so severe that the clock signal cannot be reliably derived from it and the integrity of the data is jeopardized. To reclock the data, the digital signal is reshaped by the line receiver 126 and, as previously described, forwarded via line 128 to the shift registers 150 and 152. One of the outputs of the shift register 150, namely line 154A is extended via line 226 to a line driver 227. The output of the shift register produces a pulse of the correct width for use by the line drive and the signal from the line driver 227 then appears on line 228 which is sent down the cable 62. The inductor 120 prevents the signal from travelling leftwardly but does not block the DC voltage. Capacitors 229 are provided for DC blocking and the diodes 230 are for protection of the line driver 227.

Specific circuitry that can be used to carry out the operation of the central control station portion of the present invention, and particularly the portion that multiplexes the various audio messages or signals that are generated preferably by the tape playback apparatus previously described will now be described in conjunction with FIG. 6. As shown therein, 16 analog input channels are illustrated at 231 which are inputs to the multiplexer 52 which preferably is a 16 channel multiplexer that applies the analog signal on any one addressed input to the output thereof. The addresses are determined by the four bit binary address on lines 232 and the analog output appears on line 234 which is applied to the sample and hold circuit 54. The sample and hold circuit then applies the sampled output via line 236 to the analog-to-digital converter 56 which provides an 8 bit binary signal on lines 240 which is a binary coded digital signal indicating one of 256 possible levels of the sampled analog signal that is present on line 236. The 8 bit word appearing on lines 240 is then applied to shift registers 242 and 244 which convert the parallel information to serial information on line 246 that extends to the amplifier 60 which comprises a line driver and its outputs 248 apply the signal onto the coaxial cables 62 after having been AC coupled by capacitors 250. The diodes 252 are provided for protection of the line driver. It should be appreciated that the line driver 60 is shown to have both outputs 248 utilized, illustrating that separate coaxial cables may be used to carry the signal along different paths into different areas of the museum or gallery or the like, and that both of these cables will be carrying the identical signal information. It should also be appreciated that the 16 channels may be insufficient to cover the entire number of exhibits and similar additional circuitry may be necessary for increasing the number of channels that are required in which case separate coaxial cables securing those messages would extend to the appropriate exhibits.

The timing circuitry 58 covers generally the bottom half of the circuitry shown in FIG. 6 and includes the necessary logic in which to provide the timing for the operation of the analog multiplexer, the sample and hold circuitry, analog-to-digital converter, the shift registers. The timing circuitry includes a crystal oscillator 260 which provides the basic clock frequency for the entire system with the output carrying the clock signal on line 262 that extends to the shift registers 242 and 244 as well as to a pair of counters 264 which drive, through appropriate gates, the multiplexer 52, the sample and hold circuitry 54 and analog-to-digital converter 56. Generally, the counter 266 sequences through the 16 addresses for multiplexing the 16 input channels to output line 234 and the counters 264 and 266, through the illustrated logic gates, permit the levels to settle before performing the sampling operation by the sample and hold circuit 54 and also change the mode of operation of the sample and hold circuits. Moreover, the logic gates also provide the proper timing for the analog-to-digital conversion and permits it to stabilize before asserting the convert command on line 268. A load signal on line 270 and on line 272 loads the shift registers at the appropriate time and operates to either provide an alternating one and zero signal on the output of the shift register 246 or the data word appearing on lines 240 to be serially transmitted onto the output 246.

The data transmission scheme is preferably one in which a frame comprises the sync word (having two successive 8 bit alternating binary ones and zeros) followed by the sixteen 8 bit data words for the sixteen channels, with each channel data word being separated by an 8 bit word of alternating ones and zeros. The use of a sync word comprising two successive 8 bit words having alternating ones and zeros, coupled with single 8 bit words of alternating ones and zeros between each data word for each channel supplies a generally continuing clock signal that can be used by the transmitting units 16 to derive the clock as previously mentioned. This enables the digital coding to be a NRZ (nonreturn to zero) serial transmission alternated with 8 bit words of clocking and this scheme facilitates reliable receiving of the data. In this regard, the line 262 from the oscillator 260 is applied to the shift registers 242 and 244 and provides the alternating ones and zeros and the inputs on lines 240 are inhibited when the alternating ones and zeros clocking signal is to be sent out on line 246.

From the foregoing, it should be appreciated that a unique and improved electronic tour guide system has been shown and described which exhibits superior operating characteristics and which is relatively inexpensive in terms of initial installation as well as subsequent maintenance. The system requires no electrical conduit because it utilizes low voltage levels for which the National Electric Code permits utilization of exposed coaxial cable. The visitors to the museum can hear the recorded messages with a minimal instruction, since the portable receiver units are very similar to a telephone in shape and operation. The system has the desirable attribute of being able to transmit the messages via modulated infrared energy into areas that can be well defined and, due to the fact that infrared energy is used, the system experiences virtually no interference from adjacent areas having transmitting units as is often experienced with systems that use RF transmission.

It should be understood that although certain preferred embodiments of the present invention have been illustrated and described, various modifications, equivalents and substitutions will be apparent to those skilled in the art, and, accordingly, the scope of the present invention should be defined only by the appended claims and equivalents thereof.

Various features of the invention are set forth in the following claims.

What is claimed is:

1. A tour guide system for use in a building such as a museum, art gallery or the like, comprising:
   message source means having a plurality of channels of information signals comprising messages about exhibits or the like within the building;
   means for multiplexing the channels of information signals and applying the information signals to one or more electrical conductors which extend throughout the building;
   means located along the conductor for demultiplexing the plurality of channels of information signals and deriving a single channel of information signals in an exhibit area;
   means associated with said demultiplexing means for converting said derived channel of signal information to frequency modulated infrared energy and transmitting the infrared energy into the area adjacent the exhibit;
   portable receiver means being responsive to said infrared energy for converting the same to electrical signals and including means for transducing said electrical signals to sound, thereby enabling a user carrying said portable receiver means to listen to the message being received.

2. A system as defined in claim 1 wherein said converting and transmitting means includes reflective means for directing the infrared energy into a well defined area to limit the energy to the area adjacent the exhibit and to enhance uniform strength of the infrared energy in said well defined area.

3. A system as defined in claim 2 wherein said reflective means have a highly reflective surface for maximizing the reflection of the infrared energy therefrom.

4. A system as defined in claim 2 wherein said reflective means are fabricated of highly polished aluminum.

5. A system as defined in claim 2 wherein said reflective means are in the shape of a hollow pyramid, said converting and transmitting means having infrared energy radiating means located in the top portion of said pyramidal shaped horn, the length and angle of the sides of said pyramidal shaped horn being such that single reflection of the infrared energy occurs, to thereby limit the transmission of the infrared energy at a generally uniform signal strength in said well defined area.

6. A system as defined in claim 5 wherein said pyramidal shaped horn includes mounting means for attaching the same to a support, said mounting means being adjustable to enable accurate positioning of said horn to direct said infrared energy into the desired well defined area.

7. A system as defined in claim 6 wherein said horn is adjusted to direct said energy downwardly toward said area at an angle of approximately 50° relative to horizontal.

8. A system as defined in claim 5 wherein said converting and transmitting means comprises at least one light emitting diode which emits infrared energy.

9. A system as defined in claim 8 wherein said converting and transmitting means includes a plurality of series connected infrared light emitting diodes.

10. Apparatus as defined in claim 9 wherein said plurality of infrared light emitting diodes comprises about 6 of said diodes.

11. A system as defined in claim 9 wherein said plurality of infrared light emitting diodes is mounted to a substrate that is attached to the top end portion of said pyramidal shaped reflecting horn.

12. A system as defined in claim 8 wherein said infrared energy is frequency modulated with the information signals of said messages, the frequency modulated infrared energy occurring as a function of modulation of the current passing through said infrared light emitting diodes.

13. A system as defined in claim 2 wherein said converting and transmitting means includes a voltage controlled oscillator, a current source connected to the output of said oscillator, the output of the current source varying in proportion to the voltage driving said oscillator, said current source driving said light emitting diodes, said converting and transmitting means further including buffering means connected between said oscillator and said current source to permit the addition of auxiliary current sources for driving at least one additional plurality of light emitting diodes.

14. A system as defined in claim 13 including one or more auxiliary current sources for driving an additional plurality of light emitting diodes, said current source and plurality defining an auxiliary transmitting means having a reflecting horn that can be placed at a different location and directed to the same or other well defined area as the first plurality of light emitting diodes.

15. A system as defined in claim 1 wherein said multiplexing and applying means includes means for multiplexing said plurality of channels, means for sampling each of said multiplexed channels and generating a digital signal of said samples, said applying means applying digital multiplexed information signals to said one or more electrical conductors.

16. A system as defined in claim 15 wherein said digital signals are applied to said one or more electrical conductors at a predetermined frequency, said digital multiplexed signals having intervals of clock pulses at said predetermined frequency interposed between the digital signals corresponding to the information signals that are present.

17. The system as defined in claim 16 wherein said demultiplexing means includes means for extracting said clock frequency from said digital signals including said clock signals and using the same to regenerate said predetermined frequency for use in demultiplexing said channels of digital information signals.

18. A system as defined in claim 17 wherein said demultiplexing means includes means for receiving said signal being applied to said one or more conductors, means for interrupting the signal path along the conductor, means for reconstructing said signal and reapplying the same to the downstream portion of said conductor to substantially reduce the distortion that occurs by traveling over an extended length of said conductor.

19. A system as defined in claim 1 including means for applying DC voltage to said one or more electrical conductors for supplying power to said demultiplexing means and said converting means.

20. A system as defined in claim 1 wherein said receiver means has an elongated housing with one end portion having a speaker means therein, the housing being generally in the shape of a telephone handset, the end portion having said speaker means containing an infrared energy detector adapted to receive said infrared energy when said handset is positioned near the ear of a user.

21. A system as defined in claim 20 wherein said receiver means includes a generally flat infrared filter located adjacent said infrared detector and covering the same, said filter being mounted within said housing generally flush with the outer surface thereof.

22. A system as defined in claim 20 wherein said receiver means includes a rechargeable battery means; said receiver means having apertures in the end portion opposite said speaker means, said apertures being positioned to receive charging electrodes therethrough.

23. A system as defined in claim 22 wherein said opposite end portion includes an adjustable volume control.

* * * * *